(No Model.) 4 Sheets—Sheet 1.
C. F. BRUSH.
DYNAMO ELECTRIC MACHINE.
No. 302,319. Patented July 22, 1884.
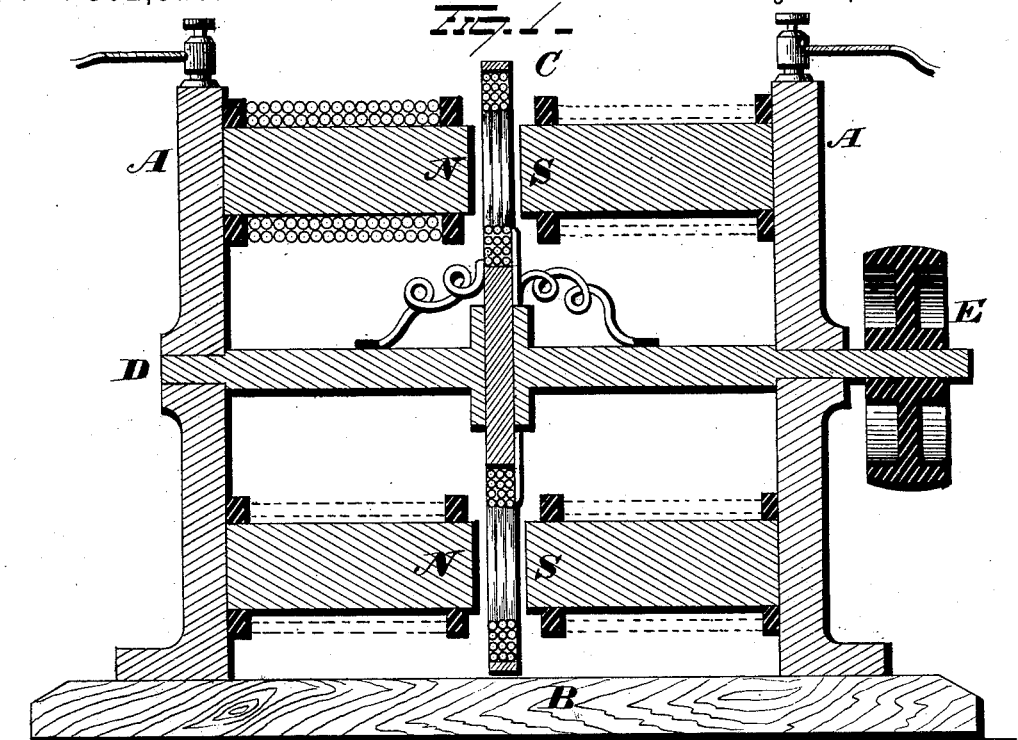
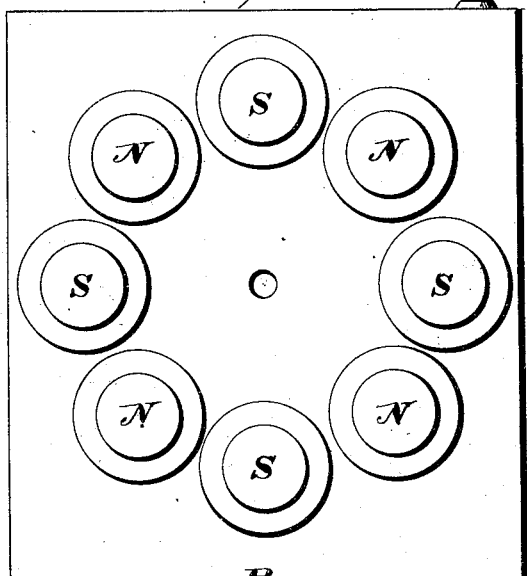
WITNESSES INVENTOR (No Model.)  4 Sheets—Sheet 2.
C. F. BRUSH.
DYNAMO ELECTRIC MACHINE.
No. 302,319.  Patented July 22, 1884.
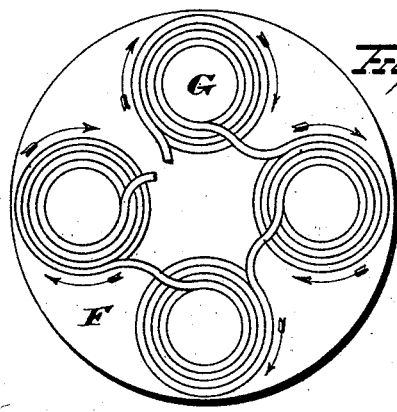
*Fig. 3.*
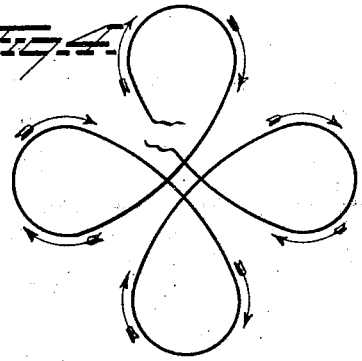
*Fig. 4.*
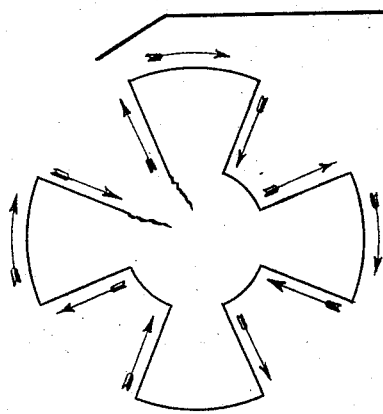
*Fig. 5.*
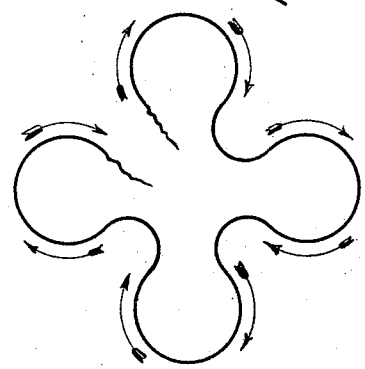
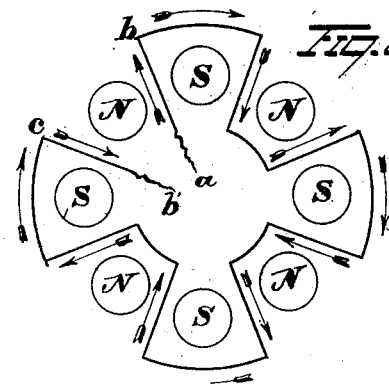
*Fig. 6.*
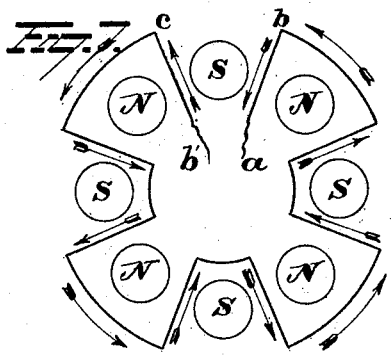
*Fig. 7.*
WITNESSES
E. H. Nottingham
J. Frank Downing
INVENTOR
Chas. F. Brush.
By Leggett & Leggett
Attorneys

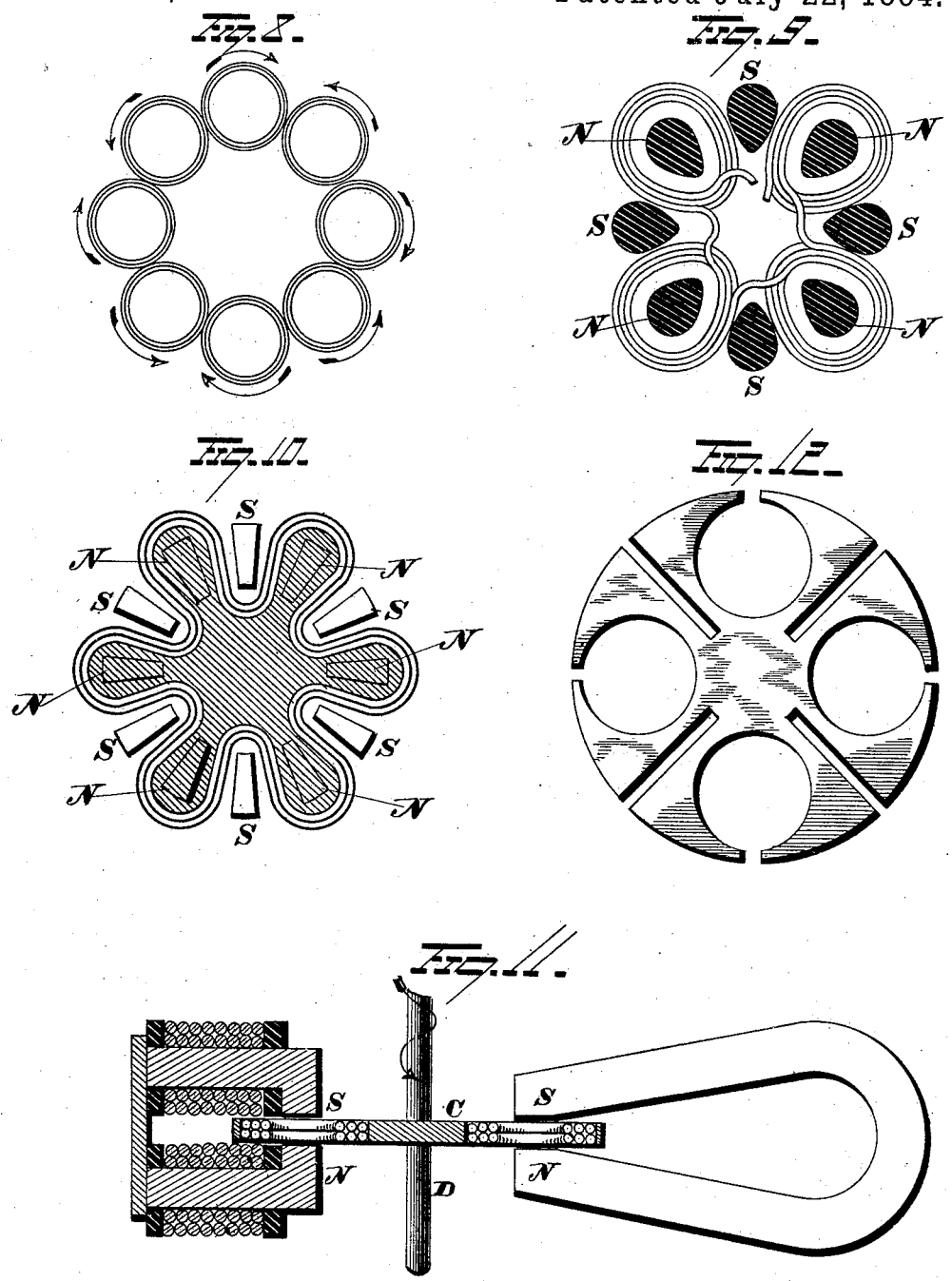

(No Model.) 4 Sheets—Sheet 4.
C. F. BRUSH.
DYNAMO ELECTRIC MACHINE.
No. 302,319. Patented July 22, 1884.
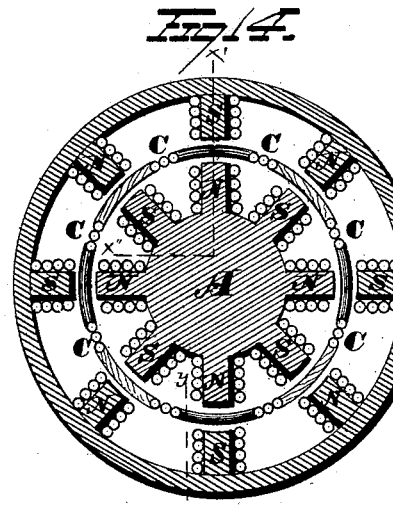
Fig. 14.
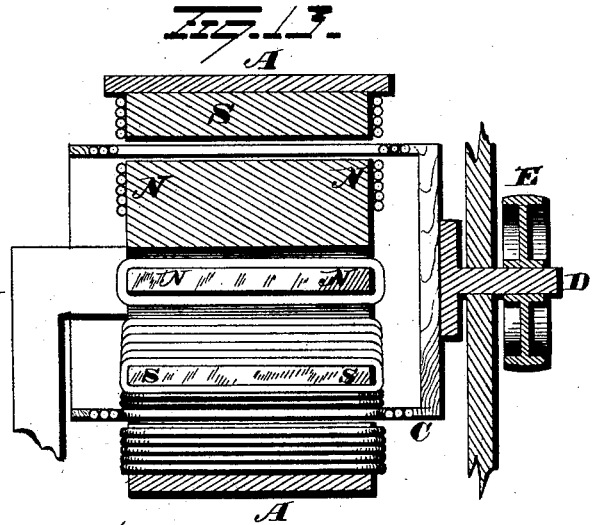
Fig. 13.
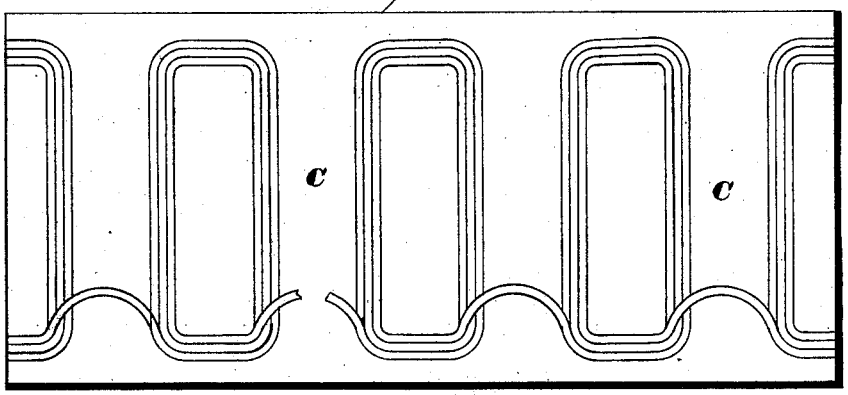
Fig. 15.
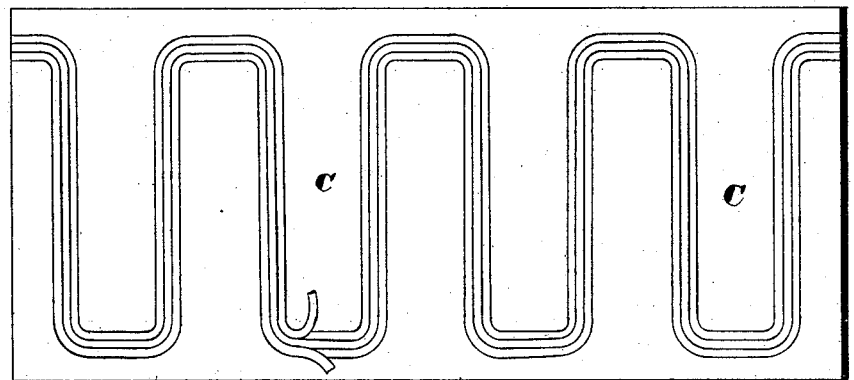
WITNESSES
E. L. Nottingham,
G. Frank Downing.
INVENTOR
Chas. F. Brush.
By Leggett & Leggett.
Attorneys.

UNITED STATES PATENT OFFICE.

CHARLES F. BRUSH, OF CLEVELAND, OHIO.

DYNAMO-ELECTRIC MACHINE.

SPECIFICATION forming part of Letters Patent No. 302,319, dated July 22, 1884.

Application filed June 30, 1882. (No model.)

*To all whom it may concern:*

Be it known that I, CHARLES F. BRUSH, of Cleveland, in the county of Cuyahoga and State of Ohio, have invented certain new and useful Improvements in Dynamo-Electric Machines; and I do hereby declare the following to be a full, clear, and exact description of the invention, such as will enable others skilled in the art to which it pertains to make and use the same.

My invention relates to dynamo-electric machines; and it consists, first, in a peculiar construction of the armature whereby the full inductive effect of the field-magnets is utilized without the presence of iron or other magnetic substance in the moving armature; second, in an arrangement of field-magnets whereby the field of force is concentrated into a very small space, in which the armature revolves. In most dynamo-electric machines before the public the bobbins of wire on the armature surround one or more cores of soft iron, to the changing magnetism of which the whole (in some) or part (in others) of the effect produced is due. This changing magnetism of the cores is a source of great loss of driving-power, which loss appears as heat in the cores. This is caused not only by the changing magnetism, but by the induction of currents in the iron itself, due to its motion in the magnetic field. Thus not only is a large portion of the driving power wasted, but the field of force is largely diverted from its proper function. In other machines wherein the armature carries no moving iron, the field of force is necessarily so large that much of it cannot be utilized, and the length of moving conductor on the armature is so great as to cause much resistance, and consequent waste of current attended with heat. If, now, a very great concentration of magnetic field can be attained without diverting any of it from its proper functions, then a rapid motion of a short armature-conductor may develop a high electro-motive force, and there being no changing magnetism or "local" induced currents, very nearly the whole of the driving-power may be utilized as available current. I have fully accomplished these important results in the apparatus I am about to describe.

Figure 1 of the drawings represents a section through its axis of a convenient form of dynamo-electric machine embodying my invention.

A A are plates of iron attached to a base of suitable material, B. Each of these plates has secured to it eight magnet-cores of iron, N S, arranged as shown in Fig. 2, which is a cross-section of Fig. 1. These cores are wound with insulated wire, and are connected in such a manner that when they become magnets by the passage of a current through the wire unlike poles shall face each other, as indicated in Fig. 1, and shall succeed each other in rotation, as in Fig. 2.

C, Fig. 1, is the armature carried by the shaft D, which passes through bearings in the upright plates A. Thus by means of the pulley E the armature may be caused to revolve in its own plane, between the poles of the magnets N S.

Fig. 3 shows the armature in plan. It consists of a disk of insulating material, F, provided with four openings, in which are placed flat bobbins of insulated copper wire or other suitable conductor, G, as shown. These bobbins are connected in such a manner that a current passing through them shall follow the course indicated by the arrows—that is, in the same direction in all. They may be connected in a single series, as shown, or so that a current may divide itself between them, still maintaining its proper direction in each.

Fig. 4 shows another method of winding the conductor without altering the direction of the circuit.

Fig. 5 illustrates still another method of arranging the conductor, which may assist in explaining the induction of currents in it when it is revolved in the magnetic field.

Suppose, now, the armature-conductor, arranged as in Fig. 5, be placed in front of one of the rows of field-magnets, as shown in Fig. 6. Then suppose it to be revolved in the plane of the figure one-eighth of a revolution to the position shown in Fig. 7. During this movement the portion $ab$ of the conductor passing in front of the pole S will have a current induced in it in the direction indicated by the arrow, while the portion $b'c$, passing in front of the pole N, will have a current induced in it in the opposite direction, and so on all around the circle; but since the conductor follows the direction of these currents all of the eight induced currents combine to produce one current in one direction through the conductor. The other set of field-magnets, being of opposite polarity and facing the conductor on the opposite side, induce a current in the same direction. During the next eighth of a revolution the current will evidently be reversed. We will then get eight currents alternately in opposite directions during each revolution of the armature.

Instead of employing four bobbins of armature-conductor, as in Fig. 3, we may employ eight, as in Fig. 8; but evidently no increased amount of conductor is permitted by this arrangement, while the use of the insulating-disk F for supporting the bobbins is rendered impracticable.

Fig. 9 shows the field-magnet cores N S of a different form of cross-section or face from those shown in Fig. 2, by which they may be made heavier and their magnetic power increased without increasing the general dimensions of the apparatus. The bobbins of the armature-conductor are also shown of corresponding shape. It will be evident that any convenient number of magnetic poles may be employed on each side of the armature, as well as the eight shown, provided the armature-bobbins are arranged accordingly.

Fig. 10 shows twelve poles and also the completed arrangement of armature-conductor indicated in Fig. 5. In this case the supporting-disk of insulating material F, Fig. 3, is replaced by a plate of the same material provided with radial arms, as shown, over which the conductor is laid. The conductor may here be conveniently formed of an insulated copper ribbon of suitable width.

It will be noticed that the armature-disk is made quite thin in comparison with its other dimensions. This allows the field-magnets on its opposite sides to be placed very near each other, thus mutually strengthening each other and concentrating the entire magnetic field in the small spaces between them, and securing the advantages above enumerated. This great concentration of the field or fields of force permits of the near approach of the laterally-adjoining magnetic poles without materially diverting the lines of magnetic force from their proper direction, thus permitting the use of a large number of poles on each side of the armature, and a corresponding number of currents to be induced in its conductor during each revolution. We may thus obtain currents of high electro-motive force with an armature-conductor of small length, and consequently of small resistance; and if we give the armature a very rapid rotation, which is quite permissible, there being no iron in it requiring changes of magnetism, we may obtain with a small apparatus an enormous current of electricity, and, for the reason already specified, it will be attended with very little heat in the machine, and very little waste of driving-power.

Fig. 11 shows a method by which the proper magnetic poles may be presented on opposite sides of the armature by means of ordinary electro-magnets or permanent magnets placed radially around it.

We have seen that the currents induced in the armature-conductor are alternately in opposite directions. These reversals may be corrected by means of a suitable commutator, and the current thus obtained passed around the field-magnets in the usual manner; or, if the machine is designed to produce an alternate current, for which it is specially adapted, the ends of the armature-conductor may be attached to the revolving shaft at each side of the armature, as shown in Fig. 1. Here the shaft is not a continuous piece of metal, but is divided by the insulating armature-disk F. If, now, the plates A A are also insulated from each other by means of the wooden base B, they will represent the terminals of the armature-conductor, the current being carried to them through the bearings of the shaft. Thus there will be no commutator to be cared for. Of course the field-magnets cannot be worked by an alternating current. There may be permanent magnets in small apparatus, but must generally be electro-magnets. They may be excited by the current from any suitable apparatus, preferably a small dynamo-electric machine giving a constant current. This may be a separate apparatus, or may have its armature carried by the shaft D, which is the simpler and preferable arrangement.

If, in an armature constructed as indicated in Fig. 8, we insert a short iron core of small diameter in each bobbin of wire, we will not very materially affect the working of the apparatus; but if the core has a considerable diameter it may seriously affect the functions of the magnets, especially if they are closely associated side by side, by forming an armature between neighboring poles on the same side of the armature while the core is passing from one to the other. These cores will also become rapidly heated, thus entailing a corresponding waste of driving-power. If we lengthen the bobbins in a direction at right angles with the plane of the armature and introduce longer cores, we must correspondingly separate the two sets of field-magnets. We will then have an ordinary form of machine, and will have lost all of the advantages which form the object of my present invention. Evidently the insulating armature-disk F may be made of metal, and suitably slotted or divided to prevent the induction of currents in it, and thus perform the functions of an insulating and supporting material, as described. Such a disk is shown in Fig. 12. It is equally evident that two or more currents, either direct or alternating, may be carried from the armature by means of suitable commutators or other conductors, or that the field-magnets may revolve while the armature is stationary, or that the magnets and armature may revolve in opposite directions.

It will be seen that I apply the term "armature" to that part of a dynamo-electric machine in which currents are induced by changing intensity or polarity of magnetic field, and without regard to the presence or absence of iron or other magnetic substance in the said armature.

In the drawings, Fig. 1 represents a section through its axis of one form of machine. Fig. 2 is a cross-section of the same. Fig. 3 is a plan view of the armature C. Figs. 4 and 5 show modified arrangement of the armature-conductor. Fig. 6 shows the same in combination with the field-magnets N S. Fig. 7 shows the armature-conductor moved one-eighth of a revolution from its position in Fig. 6. Fig. 8 shows the armature-conductor arranged in eight bobbins instead of four. Fig. 9 shows field-magnets of other than round cross-section and armature-bobbins of corresponding shape. Fig. 10 shows an armature-conductor arranged in the manner indicated in Fig. 5, in combination with twelve field-magnets. Fig. 11 shows a method of arranging the field-magnets radially around the armature. Fig. 12 shows an armature-disk of metal, so slotted as to prevent the induction of currents in it.

I have thus far particularly specified the preferred form in which my invention may be embodied. Without a departure, however, from said invention, the device above described may be modified by altering the armature-disk to the form of a cylinder, and arranging the field-magnets accordingly. Such a modification is represented in Figs. 13, 14, and 15 of the drawings.

Fig. 13 shows a longitudinal vertical section of this modified form of my invention, wherein the disk shape of armature is replaced by the cylindrical form, the position of the field-magnets being altered to correspond. Here it will be seen that the armature-conductors are located in or upon the cylindrical portion of the revolving armature, and the field-magnets are made to properly face said armature-conductors by being arranged, substantially as shown, upon the outside and inside of the cylindrical portion of the said revolving armature. Of course either the cylindrical portion referred to or the field-magnets may be made stationary, while the other shall revolve, as before stated.

Fig. 14 shows a transverse vertical section of the device represented in Fig. 13, and Fig. 15 is a developed view of the revolving armature-cylinder of the device shown in Figs. 13 and 14, representing the general plan and arrangement of the armature-conductors.

This application is a division of my application filed January 14, 1879, and such features of improvement herein shown and described, but not claimed, are reserved to form the subject-matter of claims in my original application.

Having fully described my invention, what I claim as new, and desire to secure by Letters Patent, is—

1. The combination, with two series of field-of-force magnets arranged with poles of opposite polarity facing each other, of two or more coils or folds having their planes substantially in the line of their movement between the poles of the field-of-force magnets, the opposite faces of each coil or fold being exposed to the poles of the field-of-force magnets, substantially as set forth.

2. The combination, with two series of field-of-force magnets arranged with poles of opposite polarity facing each other, of a revolving diamagnetic carrier provided with two or more coils or folds having their planes substantially in the line of their movement between the poles of the field-of-force magnets, the opposite faces of each coil or fold being exposed to the poles of the field-of-force magnets, substantially as set forth.

3. The combination, with two series of field-of-force magnets arranged with poles of opposite polarity facing each other, of two or more folds of ribbon-conductor arranged to move in their own plane between said field-of-force magnets, substantially as set forth.

4. The combination, with two series of field-of-force magnets arranged with poles of opposite polarity facing each other, of a revolving ribbon-conductor disposed in radial folds arranged to move in their own planes between said magnets, substantially as set forth.

5. The combination, with two series of field-of-force magnets arranged with poles of opposite polarity facing each other, of a revolving ribbon-conductor disposed in insulated radial folds arranged to move in their own planes between said magnets, substantially as set forth.

6. The combination, with two series of field-of-force magnets arranged with poles of opposite polarity facing each other, of a revolving diamagnetic carrier provided with two or more folds of ribbon-conductor arranged to move in their own planes between said magnets, substantially as set forth.

7. The combination, with two series of field-of-force magnets arranged with poles of opposite polarity facing each other, of a revolving diamagnetic carrier having two or more folds of ribbon-conductor secured to its periphery, said folds arranged to move in their own planes between said magnets, substantially as set forth.

In testimony whereof I have signed my name to this specification in the presence of two subscribing witnesses.

CHARLES F. BRUSH.

Witnesses:
LEVERETT L. LEGGETT,
HENRY A. SEYMOUR.